(12) United States Patent
Daios

(10) Patent No.: US 11,751,518 B2
(45) Date of Patent: Sep. 12, 2023

(54) TYING SYSTEM EMPLOYING AN ACCESSORY BEARING A QUICK ATTACHMENT HOOK FOR TYING A PLASTIC FILM COVERING FOR LINEAR CULTIVATIONS

(71) Applicant: Asterios Daios, Naoussa (GR)

(72) Inventor: Dimitrios Daios, Salonika (GR)

(73) Assignee: Asterios DAIOS, Naoussa (GR)

( * ) Notice: Subject to any disclaimer, the term of this patent is extended or adjusted under 35 U.S.C. 154(b) by 104 days.

(21) Appl. No.: 17/407,371

(22) Filed: Aug. 20, 2021

(65) Prior Publication Data
US 2022/0217922 A1   Jul. 14, 2022

(30) Foreign Application Priority Data

Jan. 14, 2021 (EP) .................................. 21151582

(51) Int. Cl.
*A01G 13/02* (2006.01)
*A01G 17/14* (2006.01)
*E04H 15/32* (2006.01)

(52) U.S. Cl.
CPC ......... *A01G 17/14* (2013.01); *A01G 13/0206* (2013.01); *A01G 13/0275* (2013.01); *E04H 15/322* (2013.01)

(58) Field of Classification Search
CPC .............. A01G 13/02; A01G 13/0206; A01G 13/0237; A01G 17/06; A01G 2017/065; A01G 17/14
USPC ........................ 47/23.1, 24.1, 29.5
See application file for complete search history.

(56) References Cited

U.S. PATENT DOCUMENTS

| | | | | |
|---|---|---|---|---|
| 2,454,464 A | * | 11/1948 | Lee ........................ | E04H 15/322 114/115 |
| 3,932,958 A | * | 1/1976 | Kistler, Jr. ................ | E04B 7/14 248/353 |
| 4,068,404 A | * | 1/1978 | Sheldon ............. | A01G 13/0206 47/29.5 |
| 4,750,508 A | * | 6/1988 | Tatoian ................. | E04H 15/003 135/118 |

(Continued)

FOREIGN PATENT DOCUMENTS

| | | |
|---|---|---|
| EP | 3639650 A1 | 4/2020 |
| GR | 1002871 B | 3/1998 |
| WO | WO 03/067964 A1 | 8/2003 |

OTHER PUBLICATIONS

European Search Report for European Application No. 21151582.0, dated Jul. 20, 2021.

*Primary Examiner* — David J Parsley
(74) *Attorney, Agent, or Firm* — Jason H. Vick; Sheridan Ross, PC

(57) ABSTRACT

The invention refers to a tying system employing an accessory bearing a quick attachment hook, for tying a plastic cover film for agricultural crops such as soft fruit covers. Cultivation of soft fruits in covered space has been growing in recent decades. Several solutions have been developed including greenhouses or gable systems. The placement, fastening and fixing of the plastic film is achieved with ropes, elastic cords or soft PVC tubing. However, the cost of binding the plastic film is significant as skilled staff and considerable amounts of man hours are required to tie the plastic film to the supporting structure. Tying the film, in most cases, is carried out by employing knots on grommets that the plastic films.

14 Claims, 8 Drawing Sheets

(56) References Cited

U.S. PATENT DOCUMENTS

| | | | | |
|---|---|---|---|---|
| 5,311,699 A * | 5/1994 | Huffman | ............... | A01G 9/22 52/63 |
| 6,889,470 B1 * | 5/2005 | Hill | ............... | A01G 13/04 47/31 |
| 7,181,807 B2 * | 2/2007 | Oatway | ............... | F16G 11/046 24/136 R |
| 7,523,584 B2 * | 4/2009 | Voehringer | ............... | A01G 13/0206 47/29.1 |
| 9,255,441 B2 * | 2/2016 | Shargani | ............... | E04F 10/0633 |
| 2008/0283688 A1 * | 11/2008 | Kaneko | ............... | F16B 5/0685 248/74.1 |
| 2009/0229085 A1 * | 9/2009 | Franklin | ............... | G09F 15/0025 24/115 M |
| 2011/0092347 A1 * | 4/2011 | Kassel | ............... | A63B 21/0552 482/121 |
| 2014/0182085 A1 | 7/2014 | Dodge | | |
| 2018/0347665 A1 | 12/2018 | LeBeau | | |
| 2020/0323152 A1 * | 10/2020 | Daios | ............... | F16B 45/00 |

* cited by examiner

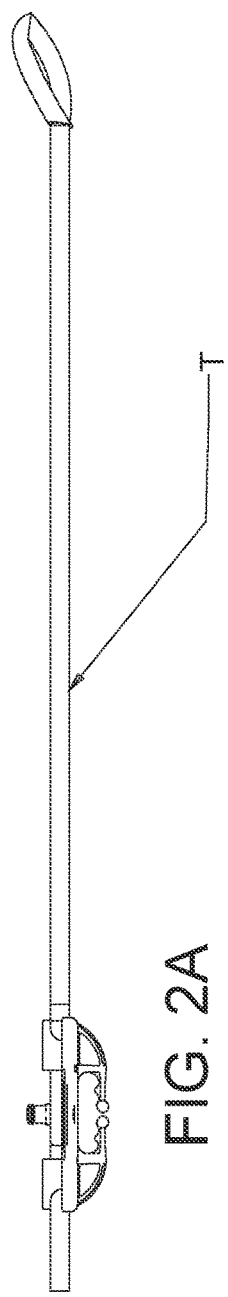
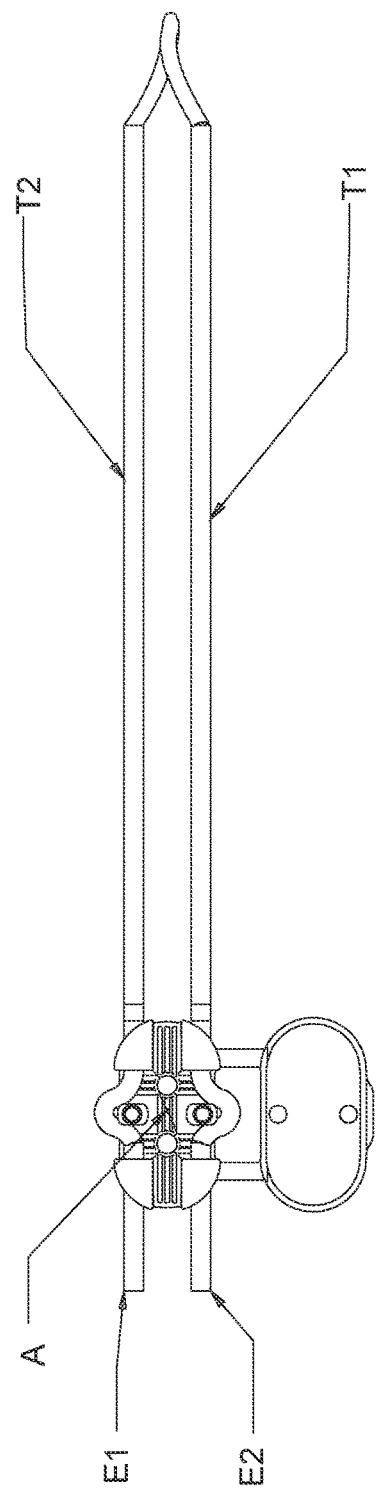
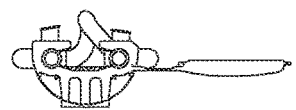
FIG. 2A
FIG. 2B
FIG. 2C

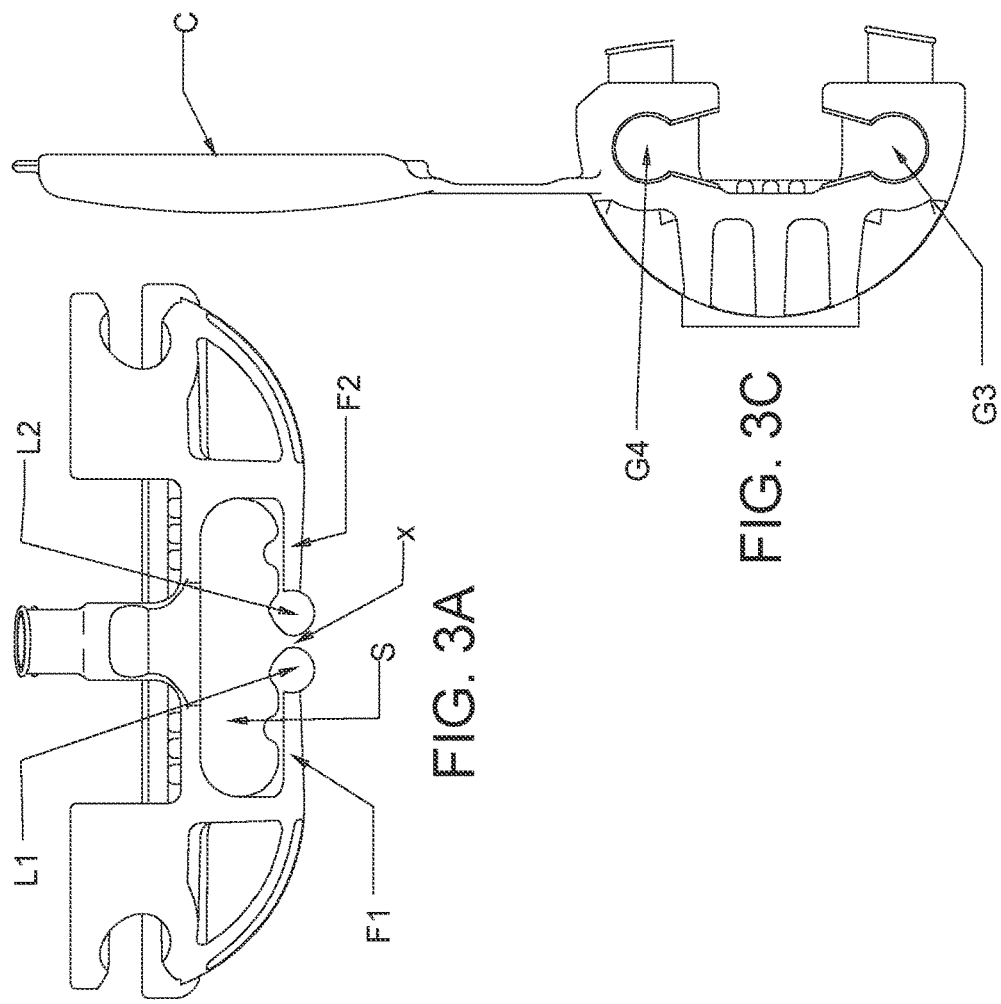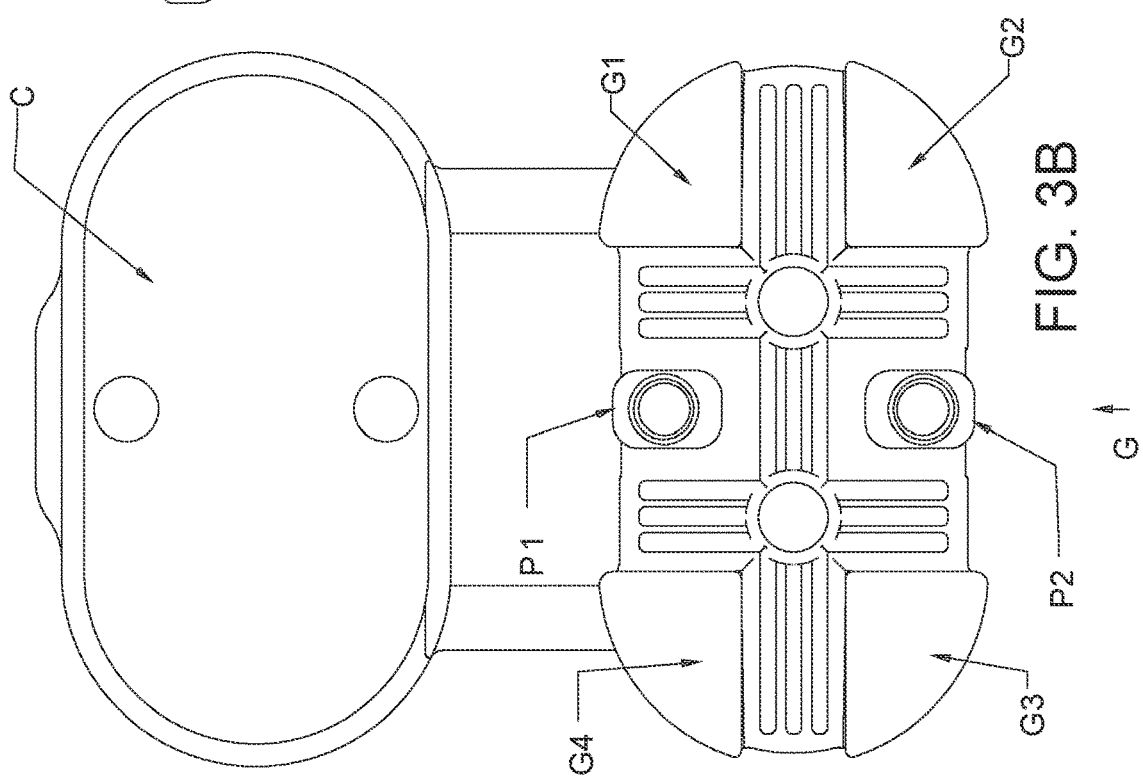

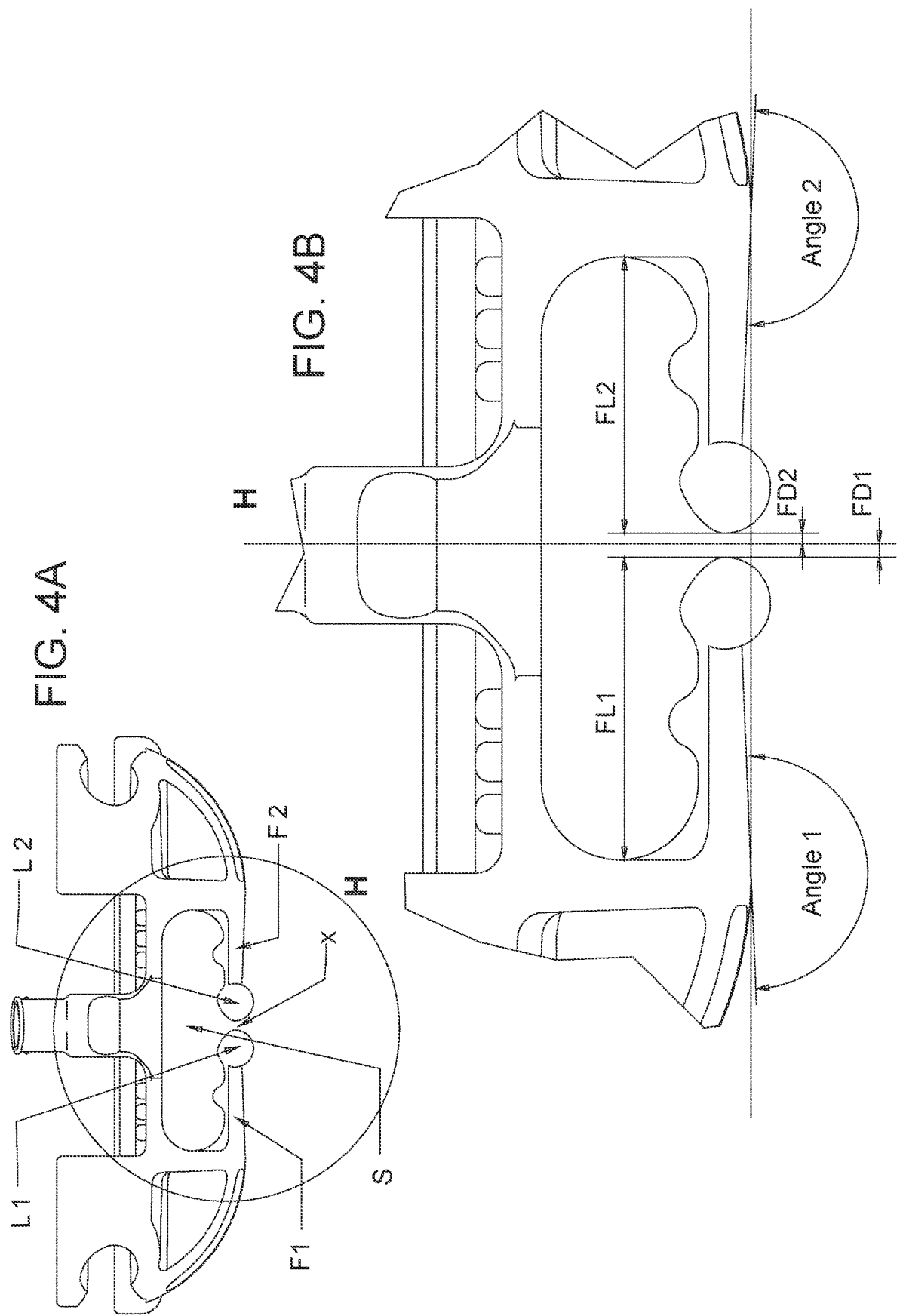

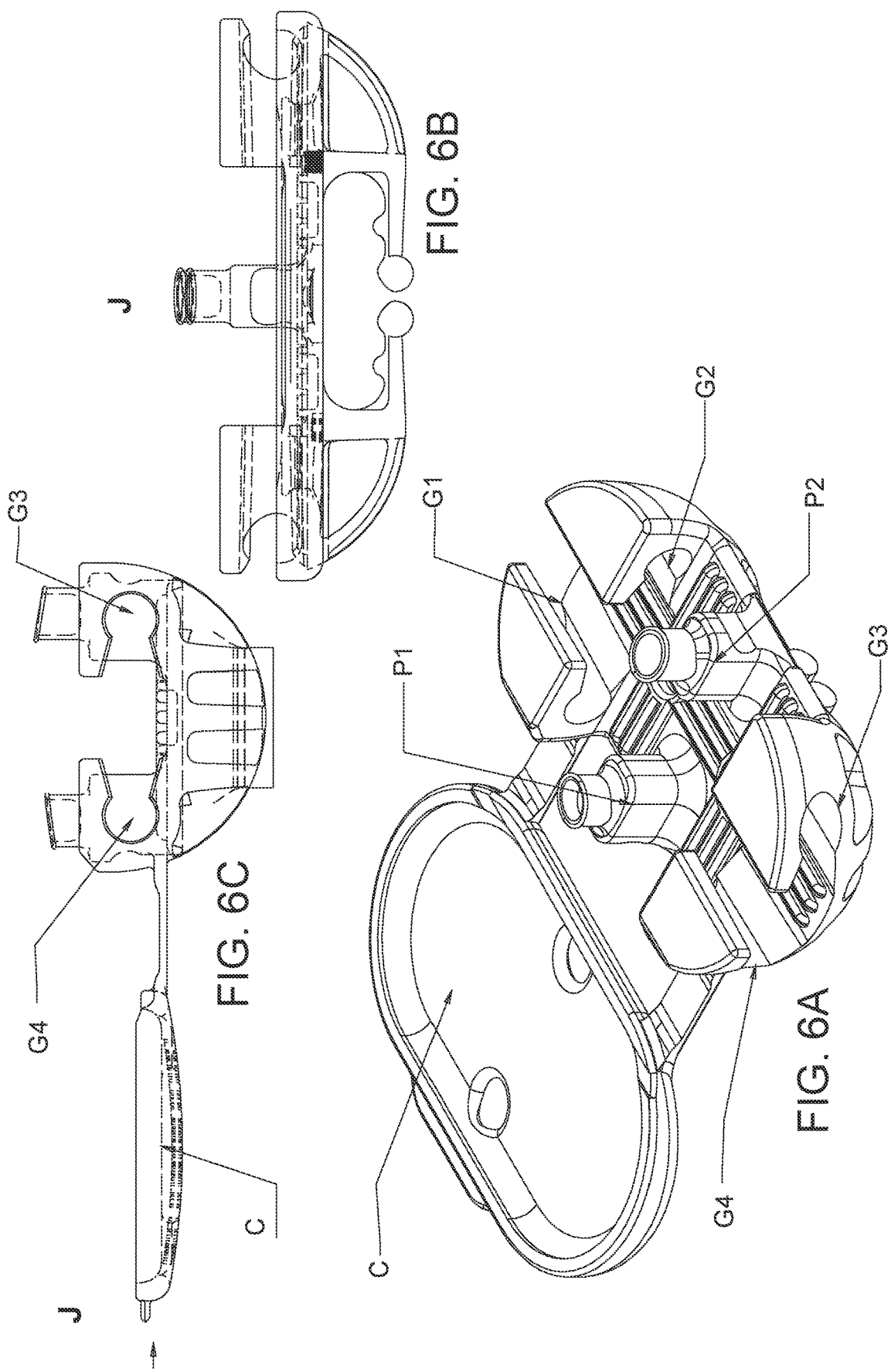

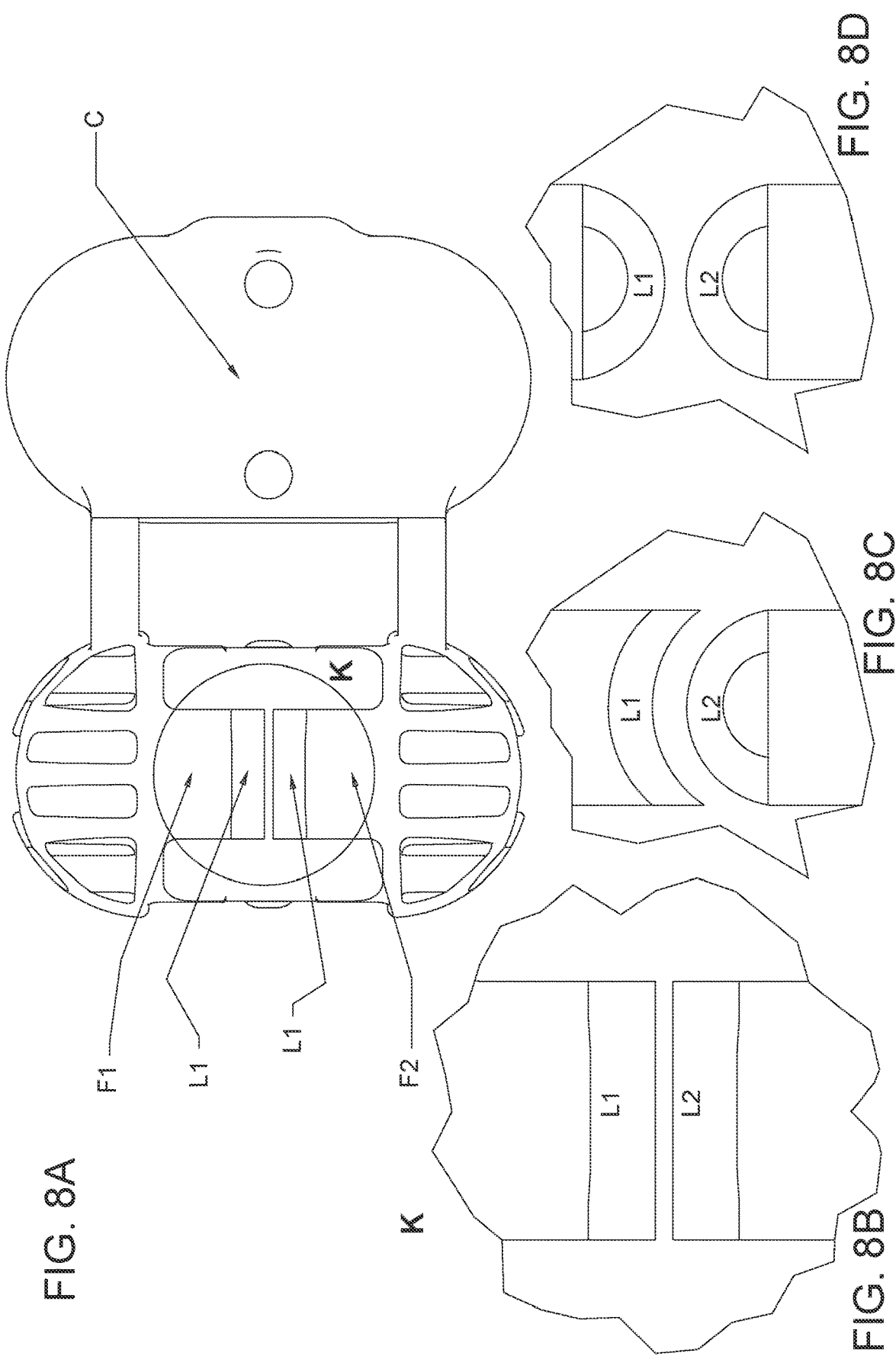

TYING SYSTEM EMPLOYING AN ACCESSORY BEARING A QUICK ATTACHMENT HOOK FOR TYING A PLASTIC FILM COVERING FOR LINEAR CULTIVATIONS

CROSS-REFERENCE TO RELATED APPLICATIONS

This application claims the benefit under 35 U.S.C. 119(a) to European Patent Application No. 21 151 582.0, filed 14 Jan. 2021, the disclosure of which is incorporated herein by reference in its entirety.

BACKGROUND

The invention refers to a tying system employing an accessory bearing a quick attachment hook, for tying a plastic cover film for agricultural crops such as soft fruit covers. Cultivation of soft fruits in covered spaces, has been growing in recent decades. Several solutions have been developed including greenhouses or gable systems. The placement, fastening and fixing of the plastic film is achieved with ropes, elastic cords or soft PVC tubing. However, the cost of binding the plastic film is significant as skilled staff and considerable amounts of man hours are required to tie the plastic film to the supporting structure. Tying the film, in most cases, is carried out by employing knots on grommets that the plastic films bear and, respectively, with knots on the wire ropes of the gable system.

Other solutions from the same inventor have been developed involving accessories that facilitate the attachment of the plastic film on the supporting structure. Said plastic film is commonly a multi-season product for reasons of lowering costs, as well as reducing the environmental footprint that single campaign plastic films have. Consequently, the film at the end of the season is either rolled and kept on the structure or it is collected and stored until the next season. The tying material (ropes, elastic cords or soft PVC tubing) is commonly kept tied on the grommets of film, while it is released from the wire ropes to allow for rolling or collection of the film. In the case of accessories being used to facilitate the attachment of the tying material to the film and/or the wire ropes, these accessories are released from the wires, without removing them off the tying material, namely the film is rolled or collected bearing the entirety of the tying system (tying material and accessories) on it. The accessories used to attach the tying material to the wire ropes of the supporting structure remain tied to the tying material and they are unhooked from the wire ropes at the end of the season.

This practice, efficient as it may be, brings along several complications, the most important of which, is that the accessories used to tie the film commonly bear hooks that may get tangled on wire ropes, as well as branches and leaves of the plants, when rolling or collecting the film. Said hooks are designed in such a fashion so that they can easily be attached to the wire rope, accelerating the tying process. However, their design proves to facilitate entanglement, thus deceleration of the collection of the film and consequently higher costs. In some cases, the entanglement can be of such an extent that the tying material or even some wire ropes need to be cut. The ramifications of cutting wire ropes extrapolate to man hours, costs of replacement materials and frustration.

An example of such an accessory was described in patent GR 1002871. Said patent discloses a plastic film that has specially formed eyelets on its sides along the length of the film, through which a special accessory that bears multiple hooks, which allow the tying and stabilization of the film on the wire ropes of the structure. While this patent addresses the need for fast and easy attachment of the film to the supporting structure rolling, collecting or retracting the film bearing these accessories with multiple hooks, proves to be an impossibility, hence the use of such products is very limited.

With patent EP 3 639 650 A1 a tying and stabilisation system has been proposed employing accessories and tying material. The accessory employed to tie the tying material to the wire rope bears a hook that is formed and shaped in such a fashion to facilitate the easy attachment of the accessory to the wire rope. However, this open geometry allows for entanglement.

Hence there is a need to develop a tying system employing an accessory that facilitates quick attachment and release from the wire ropes that will however, not get tangled when rolled or collected from the field and preferably achieve this by reducing the number of components from at least three described with EP 3639650 A1 to at least two, namely the accessory (A) and the tying material (T).

With the current invention (FIGS. 1A-1E) a tying system is proposed comprising at least two components, namely an accessory (A) and the tying material (T), said accessory that facilitates the quick and easy attachment of the tying material to the supporting structure that additionally bears a hook with a geometry that does not allow entanglement (FIGS. 2A-2C).

Said hook bears a formed entry/exit point, where the wire rope enters or exits. It comprises distinct parts, namely the free space (FIG. 3A, S), the lips (FIG. 3A, L1 and L2) and the flap or flaps (FIG. 3A, F1 and F2) (FIGS. 3A-3C and 4A-4B). The free space (S) that is formed between the main body of the accessory (A), the flap or flaps (F1 and F2) that form the lower part of the hook and the entry/exit point defined by the protruding lips (L1 and L2) through which the wire rope enters the hook. These lips serve to minimize the entry point gap (x) to smaller that at least half the minimum wire rope diameter used. Namely if the minimum diameter wire rope used is 3 mm then the gap (x) at the entry point shall be smaller than 3 mm/2 or x<3 mm/2. Accordingly, if the wire rope is 5 mm then x<5 mm/2. The flaps F1 and F2) can be seen as cantilevers whose ends closer to the gap (x), are free and the opposite ends are extensions of the main body of the accessory (A).

Since the gap (x) is smaller than the diameter of the wire ropes the flap or flaps (F1 and F2) bulge towards the main body of the accessory (A) when inserting the wire rope into the hook. Similarly, when the wire rope exits the hook the flaps (F1 and F2) bulge outwards allowing for the space needed for the wire rope to pass through.

For the wire rope to enter or exit the hook, the accessory is either pushed towards the wire rope that can be considered as an element that allows for a specific movement on the supporting structure, or is respectively pulled away from the wire rope. For the wire rope to enter or exit this action of pushing or pulling has to take place right at the entry/exit gap and the wire rope has to be in parallel to the transverse axis defined between the smallest distance of the lips at the gap. The gap (x) itself when viewed from above, is defined preferably by a straight line however it can be of any shape such as an arc, a wave or indeed any non-linear shape (FIGS. 8A-8D). In the case of a straight line the distance between the flaps (F1 and F2) is equal whereas in the case of a non-linear shape the distance can be converging or diverging. Furthermore, the gap can be perpendicular to the longitudinal axis of the main body of the accessory or it can be inclined in relation to it. Moreover, the flap or flaps (F1 and F2) leading to the entry point, seen from a side view (FIG. 4A) they can be inclined away from the main body of the accessory or they can converge towards the main body of the accessory (Angles 1 and 2 of FIG. 4B). Said flaps can be symmetrical in relation to the transverse axis of the main body of the accessory or the they can be asymmetrical. Namely the distances FL1 and FL2 can be equal or different (FIG. 4B). In the former case the flaps bulge towards the main body of the accessory in unison when the wire rope enters the hook, or similarly they bulge outwards in unison when the wire rope exits the hook. In the case of asymmetrical flaps, the shorter flap bulges less inwards or outwards as the moments developing at the longer flap are higher than the moments developing for the shorter flap. In addition, one flap can be thicker than the other, again increasing the force needed for the flap to bulge hence leading to that specific flap travelling less, thus making it easier for the wire rope to enter or exit. Consequently, if the flaps F1 and F2 are not of equal length the distance of the end of the flap FD1 to the transverse plane of the accessory (A) will be different to FD2 which corresponds to the distance of the second flap from the transverse plane of the accessory (A). In case FL1 or FL2 is equal to zero then the hook consists of one flap bearing a lip L and a stationary section either bearing the second lip or bearing no lip at all. The preferable solution is an accessory bearing two flaps (F1 and F2) and two lips (L1 and L2) with FL1≠FL2 and consequently FD1≠FD2 so that the moments developing on the cantilevers are slightly different, thus allowing also for wire ropes of several diameters. Even more preferably one flap is thicker than the other one. The free space (S) can be of different geometries as seen on FIGS. 5A-5F where several options are depicted. FIG. 5A shows a free space of asymmetric geometry, whereas FIGS. 5B and 5C show symmetric geometries. The flaps F1 and F2 are inclined away from the main body of the accessory while in the case shown with FIGS. 5D and 5E the flaps are inclined towards the main body of the accessory. Finally FIG. 5F shows a case where the flaps are almost flat compared to the longitudinal plane of the main body of the accessory. FIGS. 5A to 5F also show that the lip or lips (L1 and L2) can be of any geometry however they shall preferably be of cylindrical geometry towards the outer boundaries of the accessory and they can equally be of any geometry however preferably of cylindrical geometry as well.

At the end of every season as the film needs to be rolled, collected or retracted, the accessory is unhooked by bringing the lips parallel to the wire rope inside the hook, and pulling the accessory away from the structure's wire ropes and the film is rolled, collected or retracted bearing the tying system on every grommet. As the accessories are pulled they encounter the wire ropes, branches and leaves. The lip or lips at the entry/exit gap (L1 and/or L2) serve to deflect such obstructions that potentially enter the hook and lead to entanglements. As a film bearing the tying system is pulled it can meet the wire rope. The trajectory of the pulled tying system and the respective accessory meet the wire rope and the lips at the entry/exit gap of the accessory lead to deflecting said wire rope, as they protrude from the accessory's main body (A), hence the wire rope cannot enter the hook. The wire rope can only enter the hook if it is parallel to the smallest distance between the flaps and the accessory is pushed towards the wire rope so that the flaps bulge inwards.

The tying material (T) is a cord or tube whose one end or both ends are attached of the hook bearing accessory (A). Said ends are fixed to the accessory by using a set of formed grips (G) and a protrusion (P) placed at any position between said grips. With the patent EP 3639650 A1 the second part of the system is an accessory, bearing formations at its main body, to hold the third part of the system which is the tying material. The part bears slots or notches whose distance between its walls is smaller than the diameter of the tying material. These notches have parallel walls or the wall distance decreases as the depth of the notch increases, so that pressure is exerted on the tying material. The notches can have changing geometry along their length and bear friction increasing formations, such as bumps or strips. According to the aforementioned patent, between these notches and symmetrical thereto, there is an additional formation that causes the tying material to bypass the imaginary straight line between the notches and form angles in relation to said notches, so that the overall friction of the system is increased following the Amonton's equation.

Practical experience however has shown that the described geometries of the notches cannot safeguard that the tying material will not be released from the grips. Hence an improved version is proposed with the current invention. The accessory (A) boasts an open geometry, having three formations, namely two notches (e.g. G2 and G3) and a protrusion (P2) between them that can be symmetrical or asymmetrical in relation to the two notches (FIGS. 6A-6C). The function of this formation is again to bypass the imaginary straight line between the notches, so that angles are formed to increase the overall friction of the system. However, being asymmetrical (namely the distance between G2 and the protrusion can be greater than the distance between the protrusion and G3) allows for higher degree angles to form which in turn, following Amonton's equation increase the friction. Furthermore, to overcome the practically seen complication of the tying material being released from the notches as the exerted force on the tying material increases, the notches are formed in a specific manner. The notches bear two imaginary chambers GS1 and GS2. GS1 has walls of decreasing distance as we move from the top section of the notch towards the bottom part. At a distance from the top, the decreasing wall distance is followed by a geometry of increasing wall distance (GS2) so that the tying material is compressed as it is pulled through the decreasing wall distance part of the notch (GS1), it then expands into an increasing wall distance part of the notch (GS2). Namely the grip boasts a geometry that is converging towards its minimum distance (Gd1) right after which the geometry expands to Gd2>Gd1. Said geometry could be a cavity of cylindrical or prismoidal geometry as shown on FIGS. 7A-7I. This geometry of compression and expansion of the tying material increases the mating force of the tying material to the notch and the grip in general as when trying to release the tying material, additional force is needed to compress the tying material through the smallest distance between the walls of the notch, hence safeguarding that the tying material cannot be accidentally or unintentionally released. More importantly as the force exerted on the tying material increases, it leads to a deformation that increases the compression locally. Said compression leads to local swelling of the tying material which in turn pushes the tying material towards the section of increasing wall distance of the notch. To counter this physical phenomenon, an expanding geometry (GS2) follows the contracting geometry (GS1) of the notch allowing for the swelling of the tying material to expand in the formed cavity.

This effect in addition, increases the outer surface area of the tying material that is in contact with the grip's surface, while in the case of a tube as a tying material the inner surface of the tube is in contact as well as the tube is compressed increasing by several orders of magnitude the friction levels achieved.

The second free end (FIG. 2B, E2) of the tying material can be tied to the grommet either directly by making a knot or by looping the free end through the grommet and using an accessory similar or different to the accessory used for tying the tying material to the wire rope, or it can be tied to a second tying material that acts as an extension, the latter being then forming a fresh free that can be treated accordingly. Alternatively, the free end (FIG. 2B, E2) can be inserted to a second set of formations similar of different to the first set that the accessory holding the first free end of the tying material, bears. Thus, by looping the tying material through the grommet the tying system can consist of only two parts namely the tying material (T) and the accessory bearing the hook (A).

As mentioned above, the grips could be of varying geometry, namely the cylindrical or prismoidal so that the compressed material can expand in the formed cavities (GS2). All configurations described above allow for a secure fixing of the tying material on the accessory.

Furthermore, the top part of the accessory could be of open or closed design, namely the accessory can have a closing lid/cap (C), the latter providing an additional level of protection from entanglement as the grips and protrusion would be forming part of the internal structure of the accessory where any obstructions could not be entangled.

BRIEF DESCRIPTION OF THE DRAWINGS

FIGS. 2A-2C depict the tying system proposed with its two components
FIGS. 3A-3C depict the accessory bearing the quick attachment hook;
FIGS. 4A-4B depict the accessory with the quick attachment hook and the variables that define it;
FIGS. 6A-6C depict the accessory with the sets of grips and protrusions on its top part;
FIGS. 8A-8D depict lips L1 and L2 that form a straight line between them, or either converging or diverging geometries.

DETAILED DESCRIPTION

Figure 1A:
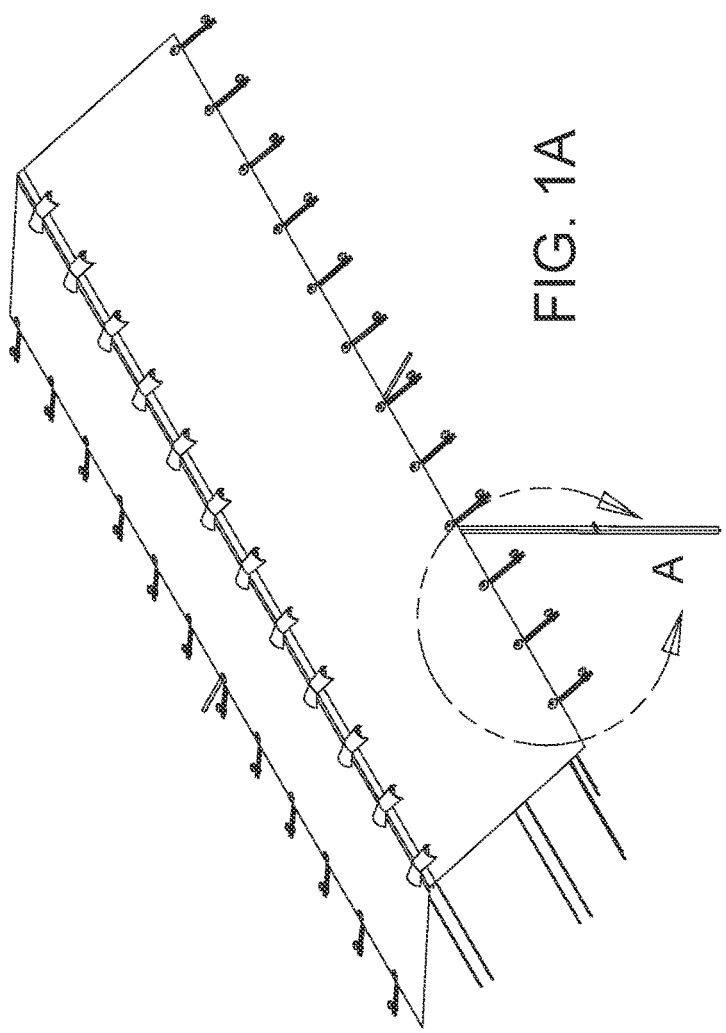
FIG. 1A shows an elevated side view.
Figure 1B:
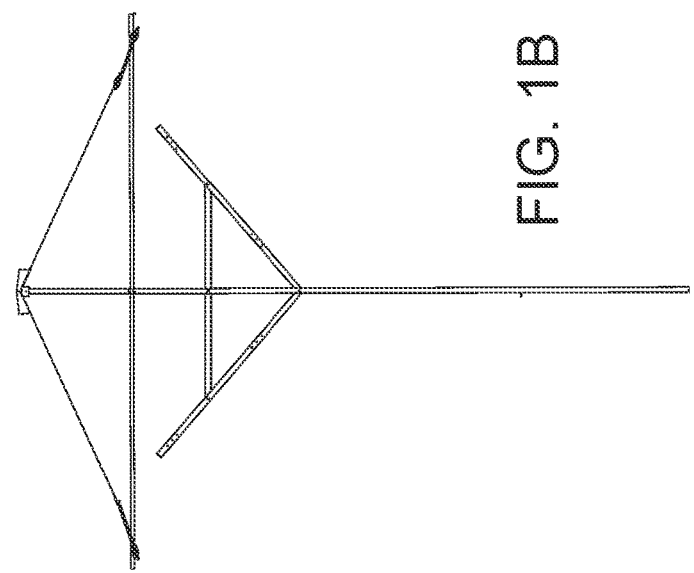
FIG. 1B shows the gable system (front view)
Figure 1C:
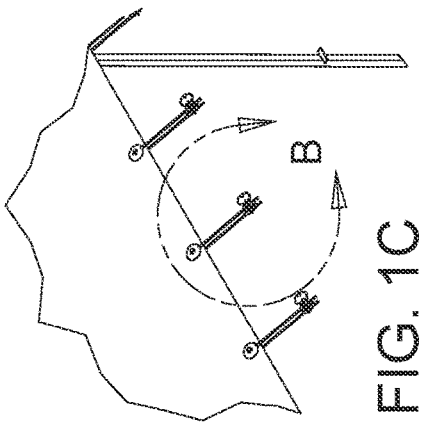
FIGS. 1C-1E are details zooming into the tying system.
Figure 1D:
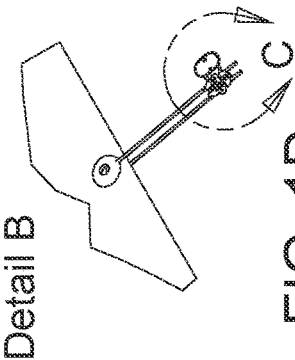
Figure 1E:
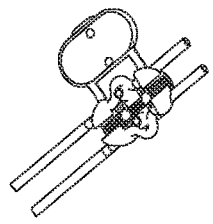
Figure 5A:
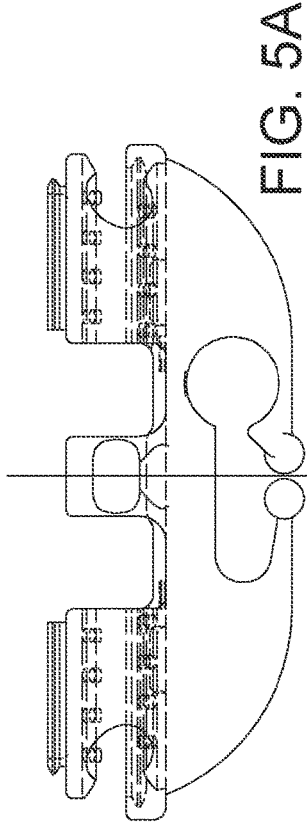
FIGS. 5A-5F depict alternative versions of the accessory.
Figure 5B:
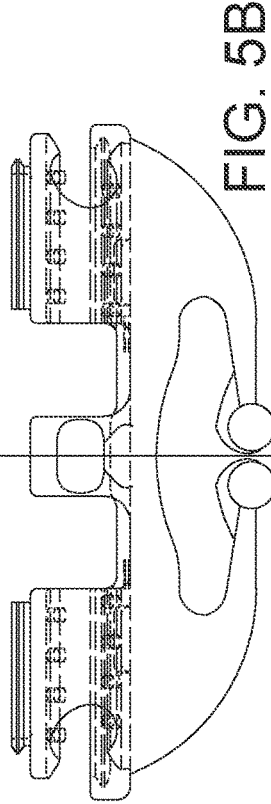
Figure 5C:
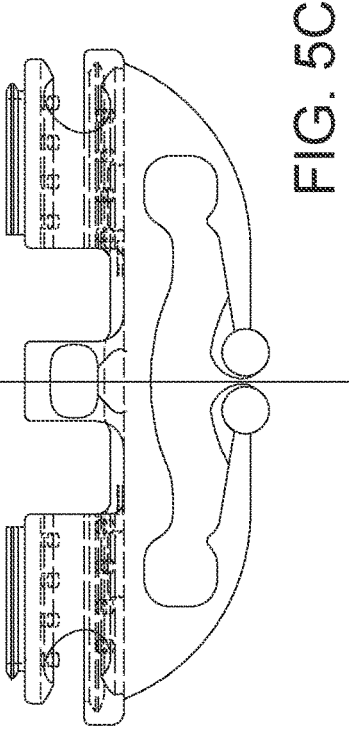
Figure 5D:
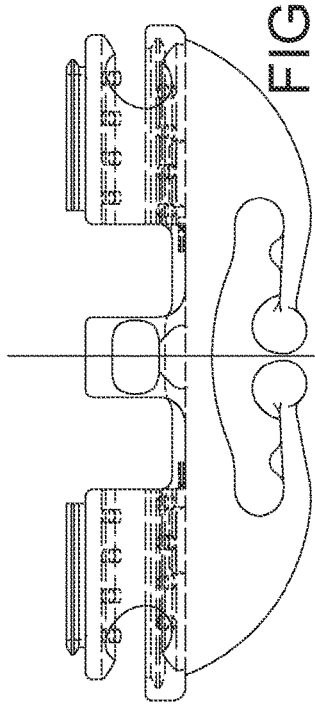
Figure 5E:
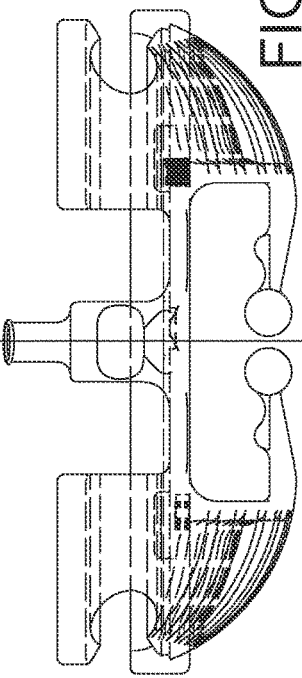
Figure 5F:
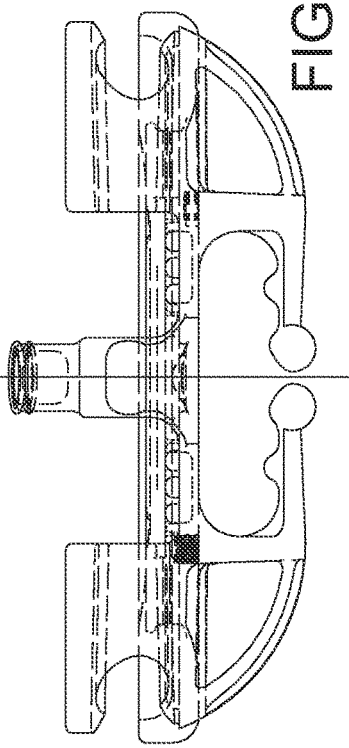
Figure 7A:
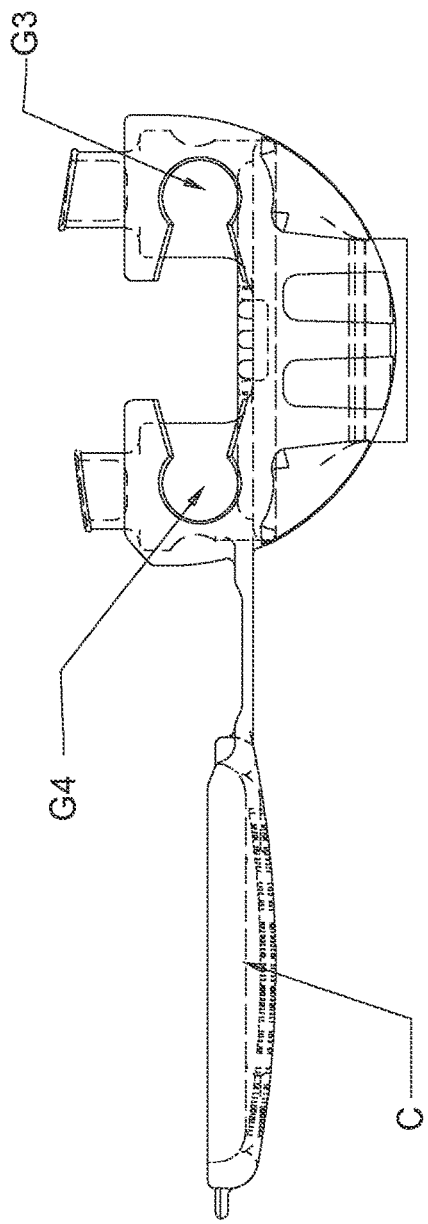
FIGS. 7A-7I depict different geometries of the cross section of the grips.
Figure 7B:
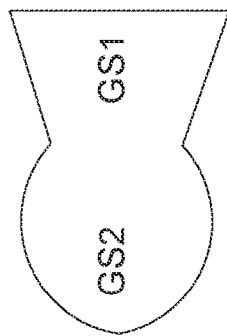
Figure 7C:
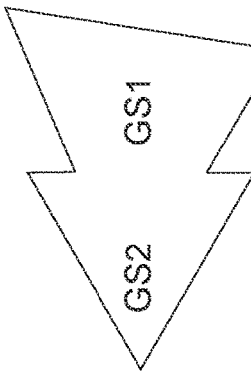
Figure 7D:
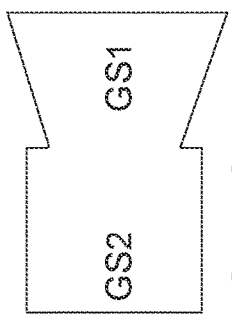
Figure 7E:
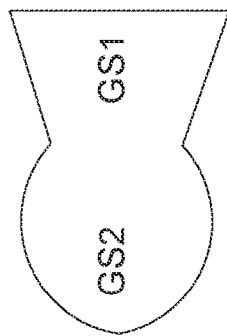
Figure 7F:
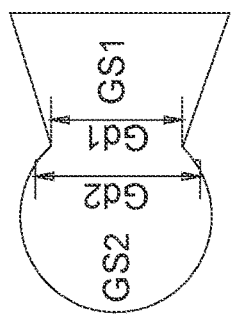
Figure 7G:
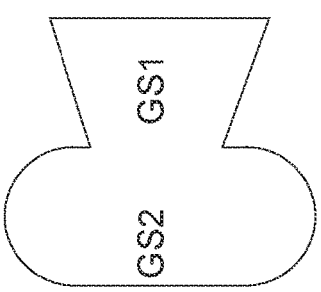
Figure 7H:
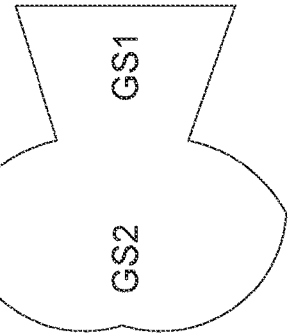
Figure 7I:
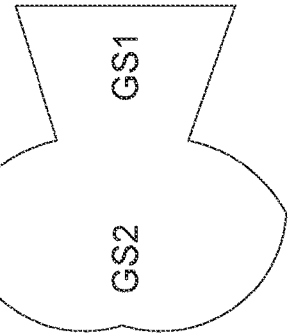

According to the principal embodiment of the invention the tying system comprises at least of two components namely a tying material and an accessory, produced preferably by injection moulding or 3D printing. The tying material can be a rope, an elastic cord, or a soft PVC tube. The accessory is a plastic part that can be made of Polypropylene, Polyamide, ABS or any other material that can accommodate high tensile and/or compression forces. The two components are produced in two separate phases as the tying material and the plastic part can be of different materials and different production processes such as extrusion and injection moulding. In case of the system comprising two components the tying material would form an imaginary loop (FIG. 2). One free end (E1) will be inserted manually in the first set of grips and protrusion in the accessory, then through the hole of the grommet on the plastic film and the second free end (E2) into the second set of grips and protrusion. This configuration distributes the forces applied on each grommet on the plastic film symmetrically onto two separate files (T1 and T2) of the same tying material, thus doubling the maximum force that the system can accommodate before failing. This configuration in comparison to a single file is more suitable for high wind areas being equally efficient for fields exposed to less strong winds. The accessory can be designed in such a fashion that it bears a lid that once the tying material is inserted it can be closed so that the grips and the protrusions constitute an internal part of the accessory adding additional protection from entanglement.

According to the second embodiment of the invention the tying system comprises two components namely the tying material and the accessory two copies of which are used to complete the tying system. In this case the tying material is inserted into the accessory's grips and protrusion on one side of the accessory then the tying material is inserted through the hole of the grommet and then fixed again in the same accessory's second set of grips and protrusion. The first accessory is positioned at a distance of preferably 5 to 50 cm and preferably 10-30 cm and more preferably 10-15 cm from the grommet's outer boundaries towards the edge of the film. The tying material is selected to be of such a length that after inserting it into the first accessory there is still a free end that is inserted to the second accessory that is identical to the first, using one set of grips and protrusion only, while the second set remains empty. The second accessory's hook is then inserted into the wire rope to fix the plastic film on the supporting structure.

LIST OF REFERENCE SIGNS

A accessory
C cap
E1, E2 free end
F1, F2 flaps
FD1, FD2 distance
FL1, FL2 distance
G1 to G4 grips
Gd1, Gd2 distance
GS1, GS2 imaginary chamber
L1, L2 lip(s)
P1, P2 protrusions
S1 to S6 accessory
T tying material

The invention claimed is:
1. An accessory for a tying system, comprising:
a main body including a first end, a second opposite end, a first side, a second opposite side, a first upper section including a first formation and a second formation, and a second lower section including a hook, wherein a first distance between the first end and the second opposite end define a length of the main body, wherein a second distance between the first side and the second opposite side define a width of the main body,
the first formation comprising a first grip with a first notch at the first end of the main body, a second grip with a second notch at the second opposite end of the main body, and a first protrusion at a first intermediate position between the first grip and the second grip and along the length of the main body, wherein the first grip, the second grip, and the first protrusion define a first opening and a second opening in the first side of the main body, the second formation comprising a third grip with a third notch at the first end of the main body, a fourth grip with a fourth notch at the second opposite end of the main body, and a second protrusion at a second intermediate position between the third grip and the fourth grip along the length of the main body, wherein the third grip, the fourth grip, and the second protrusion define a third opening and a fourth opening in the second opposite side of the main body, wherein a first plane defined from the first end to the second opposite end through the first notch, the second notch, the third notch, and the fourth notch is non-intersecting with a second plane defined from the first side to the second opposite side through the hook.

2. The accessory of claim 1, wherein at least two of the first opening, the second opening, the third opening, the fourth opening, the first notch, the second notch, the third notch, and the fourth notch are interconnected within the main body.

3. The accessory of claim 2, wherein all of the first opening, the second opening, the third opening, the fourth opening, the first notch, the second notch, the third notch, and the fourth notch are interconnected within the main body.

4. The accessory of claim 1, wherein at least one of the first opening, the second opening, the third opening, and the fourth opening include substantially opposite sidewalls with a selected spacing at a selected depth into the main body from an upper surface of the main body.

5. The accessory of claim 3, wherein at least one of the first opening, the second opening, the third opening, and the fourth opening include a second, narrower spacing between the substantially opposite sidewalls at a second, lower depth into the main body from the upper surface of the main body.

6. The accessory of claim 1, wherein at least one of the first notch, the second notch, the third notch, and the fourth notch includes a first inner chamber and a second outer chamber.

7. The accessory of claim 1, wherein at least one of:
the first intermediate location for the first protrusion is a substantially equal distance from both the first grip and the second grip; and
the second intermediate location for the second protrusion is a substantially equal distance from both the third grip and the fourth grip.

8. The accessory of claim 1, wherein at least one of:
the first intermediate location for the first protrusion is a first distance from the first grip and a second different distance from the second grip; and
the second intermediate location for the second protrusion is a third distance from the third grip and a fourth different distance from the fourth grip.

9. The accessory of claim 1, wherein the hook has an entry point and an exit point, wherein the entry point and the exit point provide access to a free space defined within the second lower section by at least one flap and a lower surface of a portion of the main body between the first upper section and the second lower section of the main body, wherein the at least one flap is attached to the main body, and wherein the at least one flap includes a lip at one end.

10. The accessory of claim 9, wherein the first notch, the first opening, the second opening, and the second notch are configured to receive and engage with a first length of tying material within the first plane, wherein the third notch, the third opening, the fourth opening, the fourth notch are configured to receive and engage with a second length of tying material within the first plane,
wherein the entry point, the exit point, and the free space are operable to receive a wire rope within the second plane, wherein at least one flap defines an entry point gap with a distance that is less than half of a diameter of the received wire rope, and wherein the at least one flap is bendable when the hook attaches to and/or detaches from the wire rope.

11. The accessory of claim 1, further comprising a lid operable to couple to the main body.

12. The accessory of claim 11, wherein the lid includes a first recess operable to receive the first protrusion and a second recess operable to receive the second protrusion when the lid is coupled to the main body.

13. The accessory of claim 12, wherein the first protrusion and the second protrusion each include an upper portion and a lower portion, wherein the first recess of the lid is operable to receive the upper portion of the first protrusion, and wherein the second recess of the lid is operable to receive the upper portion of the second protrusion when the lid is coupled to the main body.

14. The accessory of claim 11, wherein the lid is flexibly attached to the body via at least one hinge, wherein the lid is able to transition via the at least one hinge between an open position in which the lid is not coupled to the main body and a closed position in which the lid is coupled to the main body.

* * * * *

UNITED STATES PATENT AND TRADEMARK OFFICE
CERTIFICATE OF CORRECTION

| | |
|---|---|
| PATENT NO. | : 11,751,518 B2 |
| APPLICATION NO. | : 17/407371 |
| DATED | : September 12, 2023 |
| INVENTOR(S) | : Dimitrios Daios |

It is certified that error appears in the above-identified patent and that said Letters Patent is hereby corrected as shown below:

On the Title Page

Item (72) "Inventors", Column 1, Line 9, please delete "Salonika" and insert --Thessaloniki--, therefore.

Signed and Sealed this
Sixteenth Day of April, 2024

Katherine Kelly Vidal
*Director of the United States Patent and Trademark Office*